Feb. 23, 1926.
A. C. SAVIDGE
1,574,699
SHOCK ABSORBER
Filed April 20, 1923  2 Sheets-Sheet 1
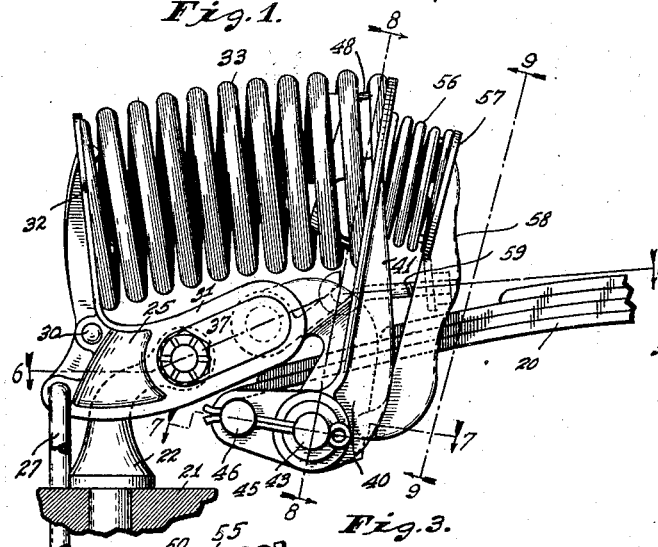
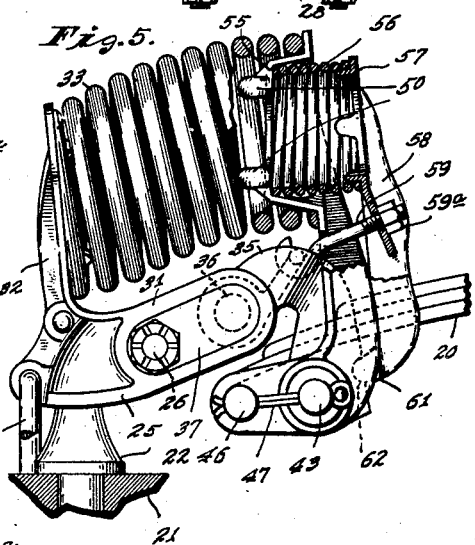
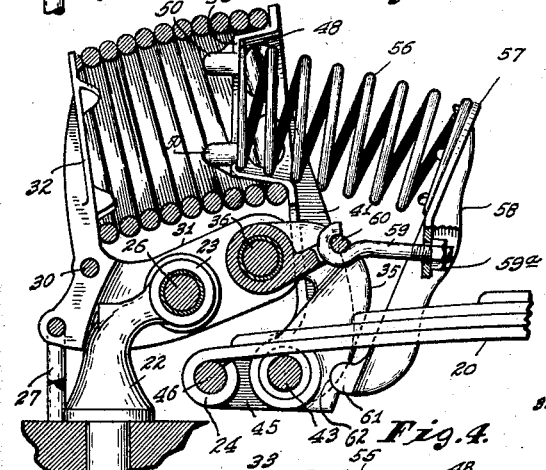
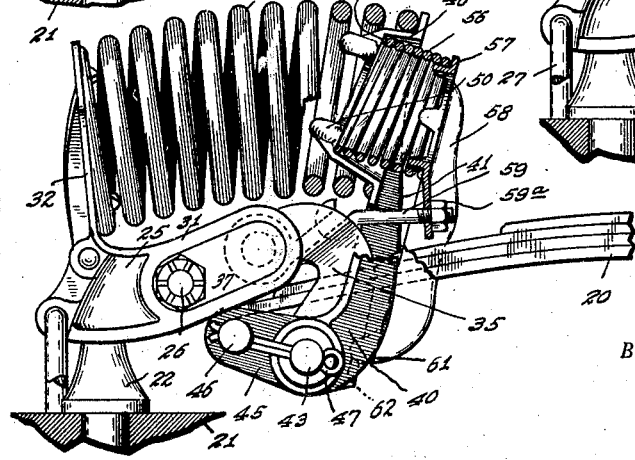
INVENTOR.
ALBERT C. SAVIDGE,
BY
ATTORNEY.

Feb. 23, 1926.
A. C. SAVIDGE
SHOCK ABSORBER
Filed April 20, 1923   2 Sheets-Sheet 2
1,574,699
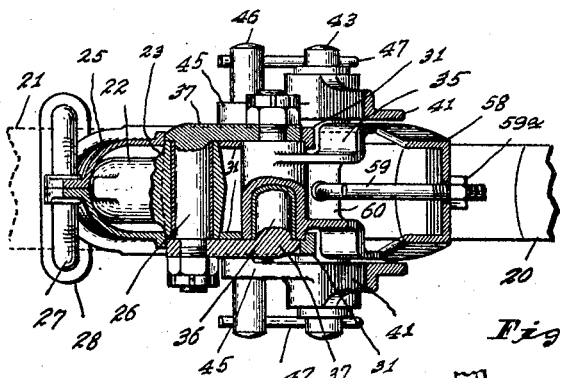
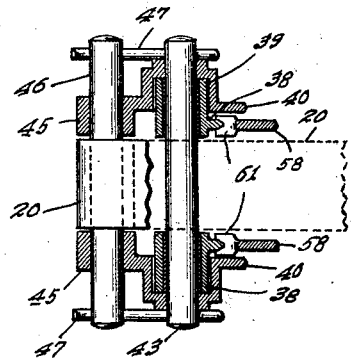
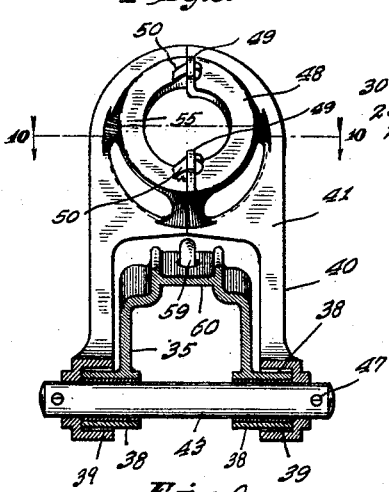
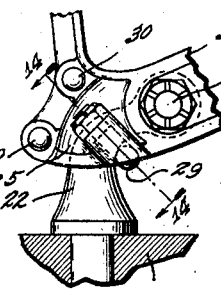
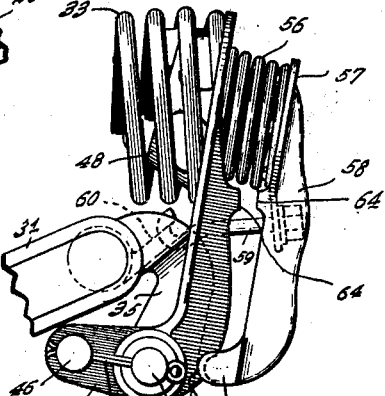
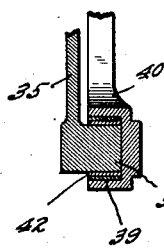
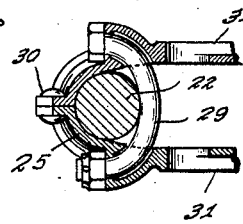
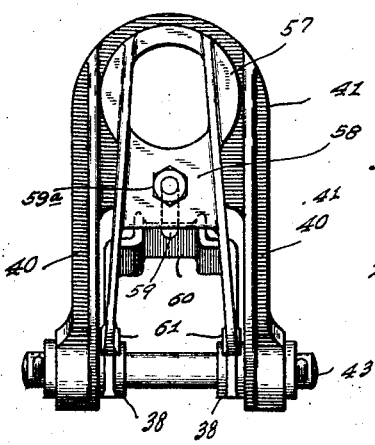
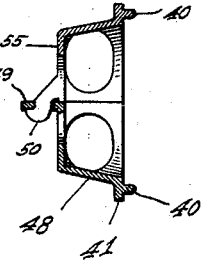
INVENTOR.
ALBERT C. SAVIDGE,
BY
ATTORNEY.

Patented Feb. 23, 1926.

1,574,699

UNITED STATES PATENT OFFICE.

ALBERT C. SAVIDGE, OF INDIANAPOLIS, INDIANA, ASSIGNOR TO ROBERT G. THOMPSON, TRUSTEE, OF INDIANAPOLIS, INDIANA.

SHOCK ABSORBER.

Application filed April 20, 1923. Serial No. 633,389.

*To all whom it may concern:*

Be it known that I, ALBERT C. SAVIDGE, a citizen of the United States, residing at Indianapolis, in the county of Marion and State of Indiana, have invented a new and useful Shock Absorber, of which the following is a specification.

It is the object of my invention to cushion or absorbs the shocks of an automobile, both direct shocks and rebound, and to do so by a shock-absorber structure which is sensitive to slight shocks in either direction to resist them softly and resiliently, but is also effective to bear adequately the heavier shocks in both directions.

The accompanying drawings illustrate my invention: Fig. 1 is a front elevation of a shock absorber embodying my invention, with fragments of the associated main-spring and axle, the parts being shown in normal position; Fig. 2 is an outer side elevation of the shock absorber of Fig. 1, with the axle shown in section; Fig. 3 is a section substantially on the line 3—3 of Fig. 2, showing the parts in position under heavy direct shock; Fig. 4 is a view similar to Fig. 3, with the section taken in a slightly different plane, and showing the parts in position under light of initial rebound; Fig. 5 is another view similar to Fig. 3, with the section taken in still another slightly different plane, and showing the parts in position under heavy or ultimate rebound; Figs. 6, 7, 8, and 9 are sectional views substantially on the lines 6—6, 7—7, 8—8, and 9—9 of Fig. 1; Fig. 10 is a section substantially on the line 10—10 of Fig. 8; Fig. 11 is a fragmentary view somewhat similar to part of Fig. 1, showing some modified features in the mounting and movement-limiting of the rebound lever; Fig. 12 is a fragmentary view similar to part of Fig. 8, showing a modified form of the pivotal interconnection between certain parts; Fig. 13 is a fragmentary view similar to part of Fig. 1, showing a modified form of lock for the perch-supporting member; and Fig. 14 is a section on the line 14—14 of Fig. 13.

My invention is particularly intended for automobiles in which a main spring is transverse to the longitudinal axis of the vehicle, or in the plane of or paralleling an axle, the main spring ordinarily being located directly above an axle; such for instance as in the Ford car. In the drawings, a fragment of such a main spring 20 and a fragment of the subjacent axle 21 are illustrated, of a general Ford type, though the natures of this main spring and axle are not part of my invention but are standard construction. Similarly, the perch 22 which projects upward from the axle 21 to provide on eye 23 from which the eye 24 in the end of the main spring 20 is hung, by a simple link in the ordinary construction, may also per se be of standard construction, such as the regular perch on the Ford axle. According to my invention, however, instead of the standard link connecting the eyes 23 and 24, I interpose my improved shock absorber between the perch 22 and such eye 24.

This shock absorber has a saddle 25 which rests on the back of the perch 22 and is attached to such perch by a pin 26 which passes through such saddle and the eye 23 of the perch. The pin 26, however, is not a pivot-pin in its action, as the saddle 25 is held from rotating on such pin. It may be so held in any suitable manner, as by a U-bolt 27 (Figs. 1 to 6) which passes through a hole in the rear end of such saddle and has its ends fastened to a cross-bar 28 beneath the axle 21 as is shown in Fig. 2, or by a U-bolt 29 which extends around the neck of the perch 22 and has its ends projecting up through suitable holes provided in the saddle 25 as is shown in Figs. 13 and 14. The saddle is made in two mating parts, fastened together by one or more rivets 30 and by the U-bolts 27 or 29, the dividing split between the parts being the middle vertical plane in which the main spring, axle, and perch 22 all lie, as is clear from Figs. 2 and 6. The saddle 25 has a pair of parallel arms 31 which project inward and upward and beyond and above the eye 24 at the end of the main spring 20; and also has a spring-abutment arm 32, shown as bifurcated, projecting upward and outward from the perch 22. The abutment arm 32 furnishes a fixed abutment for one end of the main-shock spring 33.

A link 35, preferably curved for clearance, is mounted between the ends of the two projecting arms 31 by means of a pivot pin 36 which passes through the end of such link 35. Conveniently, the pins 26 and 36 are made integral with two side-bars 37 respectively, each of which side-bars lies in a longitudinal recess in the outer face of one of the arms 31 and fits over the threaded end of the other of such pins, as is clear from Fig. 6. From the pivot-pin 36 the link 35 is shown as extending first inward in the general direction in which the arms 31 project, to provide clearance; but beyond the end of such arms, the link 35 flares and is turned downward and bifurcated to straddle the end of the main spring 20, and to provide at its lower end two alined bearing bosses 38. The bearing bosses 38 project away from each other into recesses 39 formed in the two side-arms 40 of a two-spring abutment lever 41, which is made in two mating parts so that it can be put together with such sockets over the bosses 39. The bosses 38 may bear directly in the sockets 39 to provide a pivotal connection, with suitable bushings 42 between if desired, as illustrated in Fig. 12; or they may be pivotally connected by a pivot-pin 43 which passes in common through both bosses 38 and both sockets 39, as is illustrated in Fig. 8.

The two-spring abutment lever 41 is a bell-crank, with its pivotal connection to the link 35 (as by the pin 43) at the angle of the bell-crank. Therefore, from the lower ends of each of the side-arms 40 a finger 45 projects more or less horizontally outward toward the perch 22, to eyes located at opposite axial ends of the eye 24 in the end of the main spring 20, to which eye 24 the ends of the fingers 45 are connected by a pivot-pin 46. The two pins 43 and 46 may both be held from turning and from endwise movement by cotter pins 47 passing in common through both pins.

The upper end of the two-spring abutment lever 41 is provided with a hollow somewhat conical projection 48, conveniently of skeleton form for lightness, which projects into the opposite end of the main-shock spring 33 from that which bears against the spring-abutment arm 32. This conical projection is divided, one half being formed with each half of the two-spring abutment lever 41; and to lock the two parts together, one of them has projecting perforated ears 49 projecting along the split between the parts at one side thereof, and the other has hooked fingers 50 which project through the perforations in such ears to help hold the two parts together. The two parts may be separated or put together by swinging them relatively to each other to unhook or hook the hooks 50 from or in the ears 49, which permits the sockets 39 to be separated and brought together to put them over or take them off from the bosses 38. The split between the two parts of the two-spring abutment lever 41 is preferably in the same plane as that between the two parts of the saddle 25.

The hollow projection 48 at its smaller or projecting end—the end within the main-shock spring 33—is provided with an internally projecting flange or shoulder 55, so that the inside of such projection 48 forms a pocket or cup for the reception of one end of a rebound spring 56, the spring-end abutting against such flange or shoulder 55. The other end of such rebound spring 56 bears against a spring-seat 57 on the upper end of a rebound lever 58. At an intermediate point, this rebound lever 58 carries an adjustable tension member 59, shown as a hook bolt adjustable by a nut 59$^a$, the hook end of which projects through a hole in a cross-flange 60 at a convenient point on the link 35. The lower end of the rebound lever 58 is bent to form fingers 61 which are received in notches 62 either in the lower ends of the link 35, as shown in Figs. 1, 3, 4, 5, and 7, or in the lower ends of the side-arms 40 of the two-spring abutment lever 41, as is shown in Fig. 11. The fingers 61 are themselves notched transversely to the notches 62 to fit over the edges of the parts in which the notches 62 are formed, as is clear from Fig. 7. In this way, the fingers 61 are held from slipping either vertically or transversely out of the notches 62. By adjusting the nut 59$^a$ of the adjustable hook 59, the effect of the device in its various positions may be regulated.

The saddle 25 is bifurcated to form the arms 31, which receive between them the upper end of the link 35. The lower end of the link 35, the lower end of the two-spring abutment lever 41, and the lower end of the rebound lever 58 are all bifurcated to straddle the main spring 20, and to extend below such spring, so that the pivotal interconnection between the levers 35 and 41 will both be below the main spring 20. This bifurcation of the lower end of the two-spring abutment lever is wider than that of the link 35 in order that the lower end of such link may be received between the bifurcations of the two-spring abutment lever 40, though it itself receives between its bifurcations the main spring 20. This makes a balanced construction with pivotal points below the main spring as well as above it, and avoids any tendency to twist the main spring or the parts of the shock absorber.

In operation, the parts of the shock absorber are about in the position shown in Fig. 1 when there is a normal load on the body of the automobile. The fingers 45 project outward from the lower ends of the link 35 nearly horizontally, to the pivot-pin 46; and these pivot-pins 46 lie outward beyond the vertical planes of the pivot pins 36. Both springs 33 and 56 are partly expanded, acting against each other on the upper end of the two-spring abutment lever 40; but the force of the main-shock spring 33 is more than enough to balance that of the rebound spring 56, and suffices to support in addition that of the load of the automobile-body transmitted to the two-spring abutment lever through the main spring 20. The nut 59ª is adjusted to locate the normal position of the end of the main spring 20 and its inter-balance with the springs 33 and 56; doing so by varying the tilting of the rebound lever 58, and so varying the tilt of both the two-spring abutment lever 41 and the link 35.

When by reason of unevenness in the road, the axle 21 is forced upward with relation to the body, or the body and main spring 20 are moved downward with relation to the axle, the pivot-pin 46 is swung downward with relation to the axle, toward or to a position somewhat as shown in Fig. 3; and the main spring 20 is flattened to some extent, though I have not attempted to illustrate accurately the relative positions of the main spring under different conditions. The flattening of the main spring 20 is relatively slight at first, so that a light shock is mainly taken by the main shock spring; but later, or for larger shocks, the main-spring flattening increases relatively more than does the distortion of the main-shock spring. Because of the flattening of the main spring, the pivot-pin 46 is pushed further outward toward the perch 22, in addition to its downward movement toward the axle 21. By these movements, the two-spring abutment lever 40 is turned in a counterclockwise direction, say from the position shown in Fig. 1 to the position shown in Fig. 3, about the pivotal interconnection between such two-spring abutment lever 40 and the link 35; and at the same time, the link 35 is turned about the pivot-pin 36 slightly in a clockwise direction. As a result of this, the upper end of the two-spring abutment lever 40 is moved to the left, from the position shown in Fig. 1 toward or to a position such as shown in Fig. 3; which movement is resisted by the main-shock spring 33, which thus takes the shock of a bump. This shock-taking action is augmented by the expansion of the rebound spring 56, as indicated in Fig. 3, thus lessening the push of such spring so that a larger part of the push of the main-shock spring 33 shall act to oppose the movement of the two-spring abutment lever. This expansion of the spring 56 is caused mainly by the movement to the left of the upper end of the two-spring abutment lever 35, but it is also caused in part by the movement to the right of the upper end of the rebound lever 58, due to the fact that the lower end of such rebound lever is moved to the left at this time, by the movements of the link 35 and the two-spring abutment lever 40, on one or the other of which the lower end of the rebound lever 58 bears.

This series of actions takes place without a very great deflection of the main spring 20, and without any reverse bending thereof such as occurs in some shock absorbers, for the main spring is attached to the shock absorber only at the pivot-pin 46, which is on the end of an outwardly projecting and more or less horizontal arm 45 which swings up and down only for small distances either way from the horizontal during the action of the shock absorber.

In the case of all but heavy bumps, the actions above described will stop short of the position indicated in Fig. 3, or before the main shock spring 33 is fully compressed. In the case of heavy bumps, however, I prefer to limit the turning movement of the two-spring abutment lever 40, or to limit the movement of the upper end thereof toward the spring-abutment arm 32, by a positive stop. This positive stop is most simply formed by letting the convolutions of the main shock spring 33 act as a stop when they come together upon the full compression of such spring, as indicated in Fig. 3. After that the shock-absorbing action ceases, and further approach of the automobile body and axle is resisted merely by the bending of the main spring 20.

After the main shock from the bump, producing movement of the parts from the position shown in Fig. 1 toward or to the position shown in Fig. 3, the reaction of the various springs produces a rebound; which must also be cushioned for easier riding. Then the parts move from the position shown in Fig. 3 or thereabouts, through the positions shown in Fig. 1, to the position shown in Fig. 4 for light rebounds, and to the position shown in Fig. 5 for heavy rebounds. As the automobile body moves upward with respect to the axle 21, the main spring 20 becomes more bowed, though the drawings do not undertake to show this accurately, and this results in swinging the pivot-pin 46 both upward and away from the perch 22. The swinging of the pivot-pin 46 upward causes the two-spring abutment lever 45 to swing in a clockwise direction about its pivotal interconnection with the link 35. The greater bowing of the spring 20, mainly occurring later in the rebound, causes the link 35 to swing in a counter-clockwise direction about the pivot-pin 36. These things cause the upper end of the two-spring abutment lever to move to the right, and the upper end of the rebound lever 58 to move slightly to the left. This permits the main-shock spring 33 to expand, and compresses the rebound spring 56, and the latter cushions the rebound. This may carry the parts to a position such as shown in Fig. 4. If the rebound continues beyond this position, relative movement between the upper ends of the two-spring abutment lever and the rebound lever is stopped by some limiting means, such as the coming together of the convolutions of the rebound spring 56 as indicated in Figs. 4 and 5, or by the coming together of two opposed shoulders 64 (see Fig. 11) on such two levers; and any continued rebound beyond this does not affect the condition of the rebound spring 56 but bows the main spring 20 more pronouncedly, and causes the two levers 40 and 58 and the link 35 to swing all together in a counter-clockwise direction by reason of the resultant movement of the pivot-pin 46 away from the perch 22 on account of this bowing of the main spring. This movement together of the levers 40 and 58 and the link 35 causes the curved lever 35 to swing in a counter-clockwise direction also, from the position shown in Fig. 4 toward or to the position shown in Fig. 5. These various movements result in bringing the main-shock spring again into action, so that it serves to cushion excessive rebounds.

I claim as my invention:—

1. A shock absorber for automobiles, comprising a link arranged to be pivoted above the end of the main spring and projecting below it, a lever pivoted to the lower end of said link at a point inward from the end of the main spring and having one arm projecting outward to the end of the main spring for pivotal connection therewith, and two springs acting in opposition on said lever.

2. The combination set forth in claim 1, with the addition that the two pivotal connections of said lever to said link and to said main spring respectively lie on opposite sides of the vertical plane of the pivotal axis of the upper end of said link.

3. A shock absorber for automobiles, comprising a link arranged to be pivoted above the end of the main spring and projecting below it, a lever pivoted to the lower end of said link at a point inward from the end of the main spring and having one arm projecting outward to the end of the main spring for pivotal connection therewith, a second lever having two supporting points at least one of which is on one of said first two parts, a normally fixed abutment, one arm of said first lever being between said abutment and an arm of said second lever, and a main-shock spring and a rebound spring acting respectively on said abutment and said second lever and both bearing on said first lever on opposite sides thereof.

4. The combination set forth in claim 3, with the addition that said first lever is provided with a cup-shaped part which is surrounded by the end of one of said springs and receives within it the end of the other of said springs.

5. The combination set forth in claim 3, with the addition that the two pivotal connections of said first lever with said link and said main spring respectively lie on opposite sides of the vertical plane of the pivotal axis of the upper end of said first lever.

6. The combination set forth in claim 3, with the addition that the spring-engaging parts of said abutment and said first and second levers are above the main spring.

7. The combination set forth in claim 3, with the addition that the spring-engaging parts of said abutment and said first and second levers are above the pivotal support of said first lever.

8. A shock absorber for automobiles, comprising a lever which is adapted to be pivoted at one end to the end of the main spring and projecting inwardly therefrom, means for pivotally supporting said lever at a point below the main spring and located inwardly from such pivotal interconnection with the main spring, said means including a link pivotally supported from an automobile-axle, a spring abutment rigid with the automobile-axle, a compression spring acting between said lever and said spring abutment, and a second compression spring acting on said lever in opposition to said first named spring.

9. A shock absorber for automobiles, comprising a saddle arranged to be seated on the perch of an automobile-axle and to project inward therefrom above and beyond the end of the main spring, a link pivotally mounted on the inward projection of said saddle and bifurcated to project downward on opposite sides of the main spring, a lever bifurcated to project downward astride said main spring and having its bifurcations pivoted to the bifurcations of said link below said main spring, the bifurcations of said lever being provided at their lower ends with projections outward toward said perch, which projections are arranged for pivotal connection to the eye of said main spring, and opposing springs acting on said lever above said main spring.

10. The combination set forth in claim 9, with the addition that said lever is provided with a cup-shaped part which is surrounded by the end of one of said springs and receives within it the end of the other of said springs.

11. The combination set forth in claim 9, with the addition of a spring-abutment projecting upward from said saddle for bearing against one end of one of said springs, and a second bifurcated lever straddling said main spring and abutting against the other of said opposing springs above said main spring, said second lever being provided with suitable bearing points to withstand the spring pressure upon it.

12. The combination set forth in claim 9, with the addition of a spring-abutment projecting upward from said saddle for bearing against one end of one of said springs, and a second bifurcated lever straddling said main spring and abutting against the other of said opposing springs above said main spring, said second lever being provided with bearings at the lower end of its bifurcations on one of the other bifurcated parts and with a connection at an intermediate point to pull on said saddle.

13. A shock absorber for automobiles, comprising a saddle arranged to be seated on the perch of an automobile axle, said saddle being made in two parts joined together along a vertical dividing plane extending longitudinally of the axle, each of the parts having a projection extending inwardly from the perch above and past the end of the main spring, a bifurcated link pivotally mounted at its upper end between said projections of said saddle, the bifurcations of said link projecting downward on opposite sides of said main spring past it, a split spring-abutment lever having interlocking parts above said main spring and having two downwardly extending parts on opposite sides of said main spring for pivotal connection at separated points to the eye of the main spring and to said link and opposed springs acting on opposite sides of the upper end of said spring-abutment lever.

14. The combination set forth in claim 13, with the addition that the link has pairs of oppositely projecting pivot bosses for co-operation with the saddle and lever respectively and arranged to be received in the saddle and lever when the split parts thereof are put together.

15. A shock absorber for automobiles, comprising a link arranged to be pivoted above the end of the main spring and projecting below it, a lever pivoted to the lower end of said link at a point inward from the end of the main spring and having one arm projecting outward to the end of the main spring for pivotal connection therewith, two springs acting in opposition on said lever, and means for varying the pressures exerted on said lever by said two springs.

16. The combination set forth in claim 9, with the addition of a spring-abutment projecting upward from said saddle for bearing against one end of one of said springs, a second bifurcated lever straddling said main spring and abutting against the other of said opposing springs above said main spring, said second lever being provided with suitable bearing points to withstand the spring pressure upon it, and means acting on said second lever to vary the pressures exerted on said first lever by said springs.

17. A shock absorber set forth in claim 8 with the addition of means for varying the pressures exerted on said lever by said springs.

In witness whereof, I have hereunto set my hand at Indianapolis, Indiana, this 18th day of April, A. D. one thousand nine hundred and twenty-three.

ALBERT C. SAVIDGE.